(12) United States Patent
Yoo et al.

(10) Patent No.: US 7,755,543 B2
(45) Date of Patent: Jul. 13, 2010

(54) APPARATUS AND METHOD OF CORRECTING MOVING DIRECTION OF PEDESTRIAN

(75) Inventors: Ho-joon Yoo, Seoul (KR); Hee-seob Ryu, Suwon-si (KR); Sang-on Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/219,933

(22) Filed: Jul. 30, 2008

(65) Prior Publication Data

US 2009/0212999 A1     Aug. 27, 2009

(30) Foreign Application Priority Data

Feb. 26, 2008     (KR) .................... 10-2008-0017332

(51) Int. Cl.
*G01S 1/02*     (2010.01)
*G01S 5/14*     (2010.01)
*G01C 21/06*    (2006.01)

(52) U.S. Cl. ........................... 342/357.14; 342/357.06; 342/357.13

(58) Field of Classification Search ............ 342/357.06, 342/357.08, 357.13, 357.14; 701/213, 215
See application file for complete search history.

(56) References Cited

U.S. PATENT DOCUMENTS

| | | | | |
|---|---|---|---|---|
| 5,146,231 A | * | 9/1992 | Ghaem et al. | 342/419 |
| 6,546,336 B1 | * | 4/2003 | Matsuoka et al. | 701/213 |
| 2006/0217921 A1 | * | 9/2006 | Kourogi et al. | 702/150 |

* cited by examiner

*Primary Examiner*—Dao L Phan
(74) *Attorney, Agent, or Firm*—Staas & Halsey LLP

(57) ABSTRACT

Provided are an apparatus and a method of correcting a moving direction of a pedestrian, which can estimate a pedestrian location accurately by correcting error components that are included in a moving direction angle, detected by a terrestrial magnetism sensor. The apparatus for correcting a pedestrian moving direction, including a signal receiving unit which estimates a pedestrian location using a satellite signal from a satellite, a sensor unit which detects a first moving direction angle using a terrestrial magnetism sensor, and a control unit which calculates a second moving direction angle using a pedestrian location estimated by using a satellite signal of good reception quality and corrects the first moving direction angle detected by the terrestrial magnetism sensor by using the calculated second moving direction angle.

10 Claims, 5 Drawing Sheets

APPARATUS AND METHOD OF CORRECTING MOVING DIRECTION OF PEDESTRIAN

CROSS-REFERENCE TO RELATED APPLICATIONS

This application claims priority from Korean Patent Application No. 10-2008-0017332, filed on Feb. 26, 2008, the disclosure of which is incorporated herein in its entirety by reference.

BACKGROUND

1. Field

One or more embodiments of the present invention relate to a navigation system, and more particularly, to an apparatus and method of correcting a moving direction of a pedestrian.

2. Description of the Related Art

A pedestrian navigation system is a system for estimating a location of a pedestrian by using a terrestrial magnetism sensor and an acceleration sensor that collects information of a moving direction and paces of the pedestrian.

The terrestrial magnetism sensor measures the intensity of the Earth's magnetic field to detect a direction angle. In other words, the direction angle detected by the terrestrial magnetism sensor enables estimation of a moving direction of a pedestrian. The terrestrial magnetism sensor may include a fluxgate sensor, a magnetic sensor, etc.

However, a moving direction angle of a pedestrian detected by a terrestrial magnetism sensor cannot be accurately measured due to the influences of other magnetic fields around the sensor, an attachment error of the terrestrial magnetism sensor, and a direction angle error due to the deflection difference between the magnetic north and the true north. In this case, the attachment error of the terrestrial sensor may occur when there is a mismatch between an axis of the terrestrial magnetism sensor and an axis of a body of the pedestrian. Additionally, an azimuth error caused by other magnetic fields around the terrestrial magnetism sensor may occur when the Earth's magnetic field is affected by magnetic fields generated by electric wires or communication wires. Consequently, a moving location of the pedestrian cannot be estimated accurately.

SUMMARY

One or more embodiments of the present invention provide an apparatus and a method of correcting a moving direction angle of a pedestrian, in which a moving direction angle of the pedestrian is calculated by using a signal received from a satellite, a terrestrial magnetism sensor detects a moving direction angle of the pedestrian, and the detected moving direction is corrected based on the calculated moving direction of the pedestrian.

One or more embodiments of the present invention provide an apparatus for correcting a pedestrian moving direction, including a signal receiving unit which estimates a pedestrian location using a satellite signal from a satellite, a sensor unit which detects a first moving direction angle using a terrestrial magnetism sensor, and a control unit which calculates a second moving direction angle using a pedestrian location estimated by using a satellite signal of good reception quality and corrects the first moving direction angle detected by the terrestrial magnetism sensor by using the calculated second moving direction angle.

The control unit may check whether a reception quality of a satellite signal received by the signal receiving unit meets a quality threshold, and if the reception quality of the satellite signal meets the quality threshold, the control unit may calculate the second moving direction angle using by the estimated pedestrian location.

The control unit may obtain a linear equation that passes through the estimated pedestrian location by using line fitting calculation, and obtain a slope of the obtained linear equation to calculate a second moving direction angle.

One or more embodiments of the present invention also provide a navigation system, including a pedestrian moving direction correcting apparatus, the system including a signal receiving unit which estimates a pedestrian location by using a satellite signal from a satellite, a sensor unit which detects a first moving direction angle, and a control unit which calculates a second moving direction angle using a pedestrian location estimated by using a satellite signal of good reception quality and corrects the first moving direction angle detected by the terrestrial magnetism sensor by using the calculated second moving direction angle.

One or more embodiments of the present invention also provide a method of correcting a moving direction of a pedestrian, including storing a first moving direction angle estimated by using the intensity of the Earth's magnetic field detected by a terrestrial magnetism sensor and a pedestrian location estimated by using a satellite signal meeting a reception quality threshold, calculating a second moving direction angle by using the stored pedestrian location, and a correction angle of the stored first moving direction angle by using the second moving direction angle, and correcting a first moving direction angle detected by the terrestrial magnetism sensor by using the calculated correction angle.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
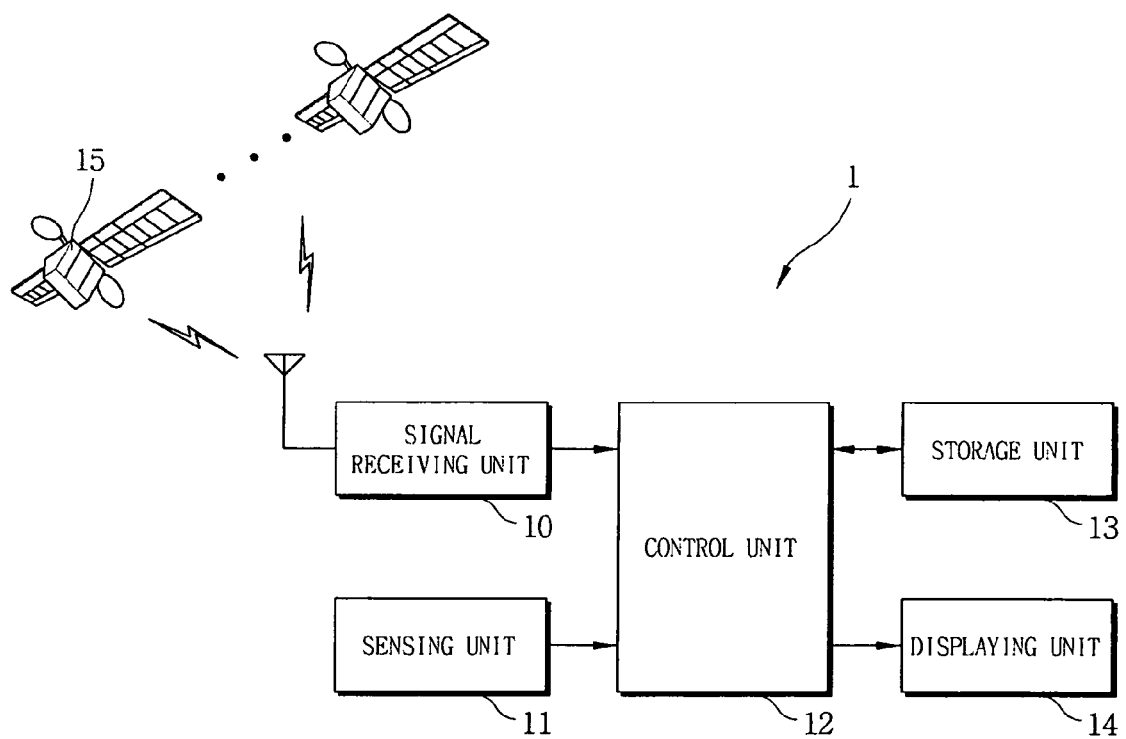
FIG. 1 shows a structure of an apparatus for correcting a moving direction of a pedestrian according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 shows a structure of an apparatus 1 for correcting a moving direction of a pedestrian according to an embodiment of the present invention. As shown in FIG. 1, the apparatus 1 includes a signal receiving unit 10, a sensor unit 11, and a control unit 12. Herein, according to one or more embodiments of the present invention, a system including such an apparatus may also not be limited to a single enclosure or all described elements embodied in single respective enclosures in all embodiments, but rather, depending on embodiment, is open to being embodied together or separately in differing enclosures and/or locations through differing elements, e.g., a respective system could be a single processing element or implemented through elements within a distributed network, noting that additional and alternative embodiments are equally available.

The signal receiving unit 10 estimates a pedestrian location using a satellite signal received from a satellite. Specifically, the signal receiving unit 10 receives a satellite signal from a plurality of satellites 15, each of which is placed in a predetermined orbit over the Earth, and detects a distance between the satellite 15 and the apparatus 1, and a location vector of the satellite 15. The signal receiving unit 10 estimates the pedestrian location using the detected distance between the satellite 15 and the apparatus 1 and location vector of the satellite 15.

The sensor unit 11 measures the intensity of the Earth's magnetic filed using a terrestrial magnetism to output a first moving direction angle. Generally, a fluxgate sensor or a magnetic sensor is used as the terrestrial magnetism sensor. The first moving direction angle may include a direction angle detected by the terrestrial magnetism sensor, influence of other magnetic fields, an error caused by inappropriate attachment of the terrestrial magnetism sensor, and a direction angle error due to the deflection difference between the magnetic north and the true north. In this case, the attachment error of the terrestrial magnetism sensor may occur due to a mismatch between an axis of the terrestrial magnetism sensor and an axis of a pedestrian's body. In addition, the direction angle error due to other magnetic fields may occur when the Earth's magnetic field is affected by a magnetic field generated by an electric wire or a communication wire.

The control unit 12 calculates a second moving direction angle by using the pedestrian location estimated by using received satellite signal of good, i.e., acceptable, reception quality. At this time, the control unit 12 checks reception quality of the satellite signal from the satellite 15 before calculating the second moving direction angle. In other words, the control unit 12 uses dilution of precision (DOP) of the satellite 15 or signal to noise ratio (SNR) of the received satellite signal to check whether the signal reception quality meets a threshold quality level, for example. When the signal receiving unit 10 is located in a mountain area or a city area and thus reception quality of the satellite signal is not good, the calculated second moving direction angle cannot ensure the accurate estimation of the pedestrian location.

Furthermore, the control unit 12 conducts line fitting calculation to obtain a linear equation that passes through the estimated pedestrian location, and obtains a slope of the linear equation so that the second moving direction angle can be calculated. This procedure will be described in more detail later.

Then, the control unit 120 determines a correction slope of the first moving direction angle detected by the sensor unit 11 using the calculated second moving direction angle in order to correct the first moving direction angle. The correction slope can occur due to the influence of the magnetic field, an error caused by inappropriate attachment of the terrestrial magnetism sensor, or a direction angle error due to the deflection difference between the magnetic north and the true north. Thus, the determined correction angle may correspond to an error component included in the first moving direction angle.

The apparatus 1 for correcting a moving direction of a pedestrian may further include a storage unit 13 and a display unit 14.

The storage unit 13 stores the pedestrian location estimated by using the received satellite signal of good reception quality and stores the first moving direction angle detected by the sensor unit 11.

The display unit 14 displays the moving route or moving direction of the pedestrian that has been estimated by the control unit 12 using the first moving direction angle output from the sensor unit 11. That is, the control unit 12 estimates the pedestrian location using the first moving direction angle output from the sensor unit 11 and outputs the estimated pedestrian location by mapping it on a predetermined map image.

Hereinafter, operations of the apparatus 1 for correcting a moving direction of a pedestrian will be described with reference to FIGS. 2 to 5 in conjunction with FIG. 1.

Figure 2:
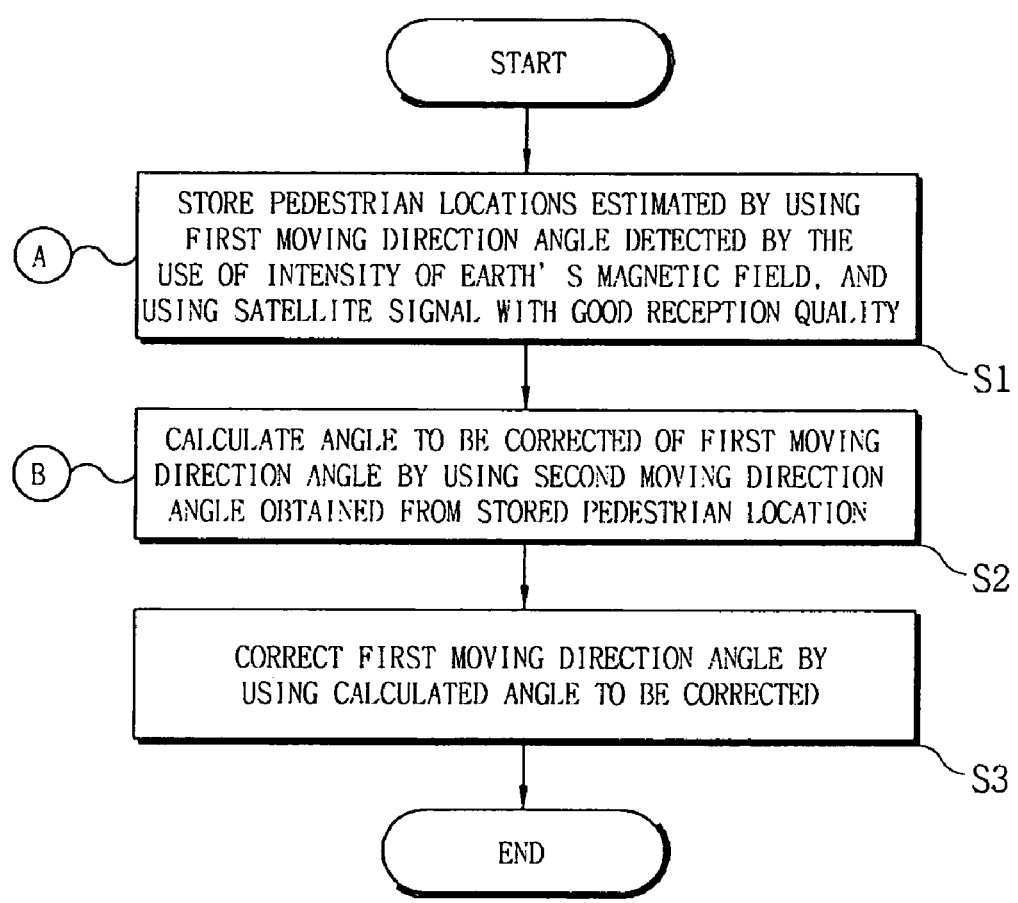
FIG. 2 is a flowchart of a method of correcting a moving direction of a pedestrian according to an embodiment of the present invention.

FIG. 2 is a flowchart of a method of correcting a moving direction of a pedestrian according to an embodiment of the present invention. As shown in FIG. 2, the method of correcting the moving direction of a pedestrian is carried out sequentially by first storing a pedestrian location estimated by using a first moving direction angle, which has been detected by the use of the Earth's magnetic field, and a received satellite signal of good reception quality, calculating a second moving direction angle by using the stored pedestrian location, calculating a correction angle of the first moving direction angle by using the second moving direction angle, and correcting the first moving direction angle, which has been detected by a terrestrial magnetism sensor, based on the calculated correction angle.

The signal receiving unit 10 estimates the pedestrian location using the satellite signal from a satellite 15. Specifically, the signal receiving unit 10 uses satellite signals from a plurality of satellites 15 located in a predetermined orbit over the Earth, and detects a distance between each satellite 15 and the apparatus 1 for correcting a moving direction of a pedestrian, and a location vector of each satellite 15. Then, the signal receiving unit 10 estimates the pedestrian location by using the detected distance between the satellite 15 and the apparatus 1 and the location vector of the satellite 15.

The sensor unit 11 detects the first moving direction angle using the intensity of the Earth's magnetic field measured by the terrestrial magnetism sensor. Such estimation of the pedestrian location and output of the first moving direction angle can be carried out at the same time when the pedestrian is moving.

Figure 3:
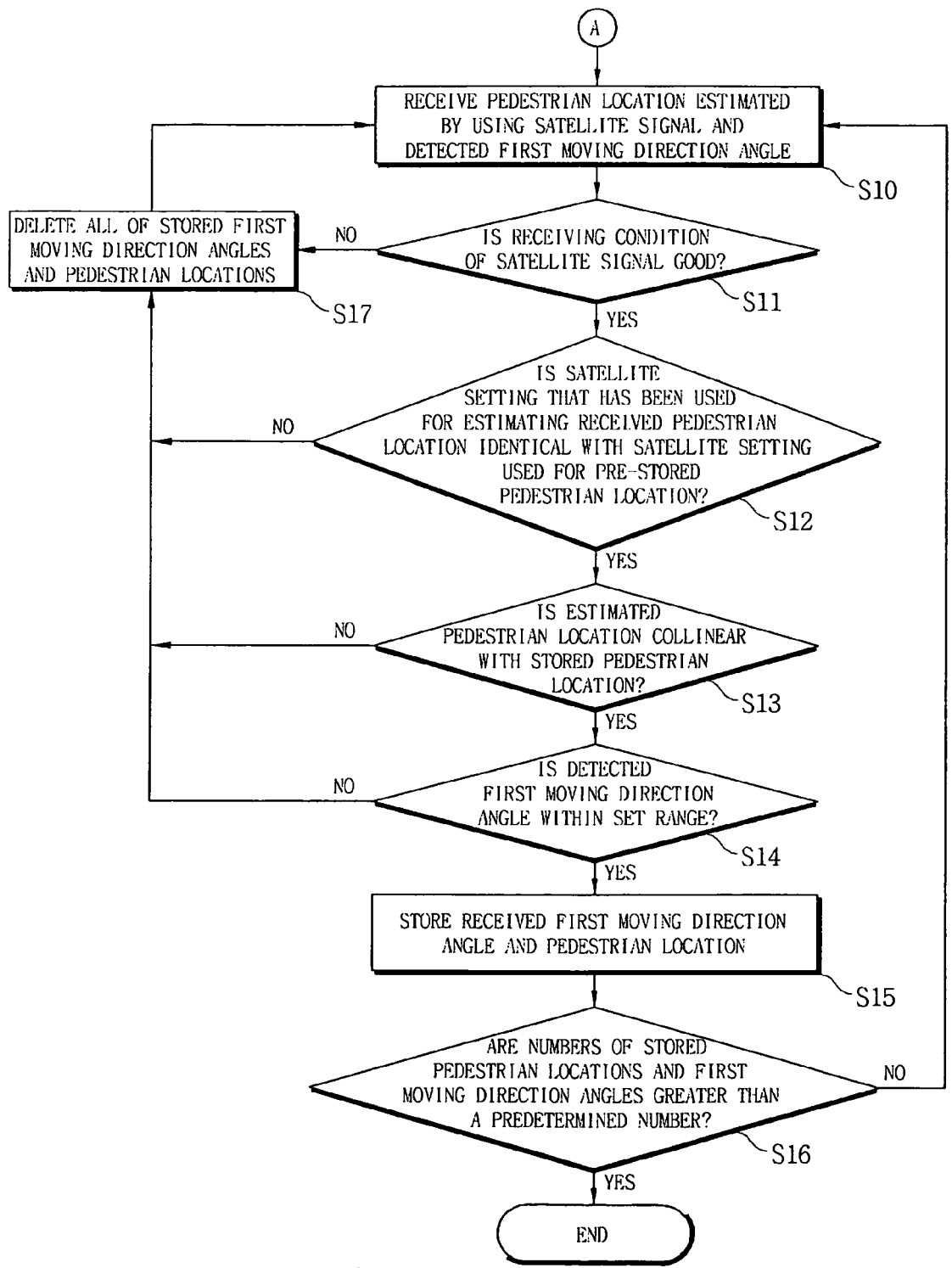
FIG. 3 is a flowchart of a method of storing the pedestrian location and the first moving direction angle according to an embodiment of the present invention.

The control unit 42 stores the first moving direction angle detected by the sensor unit 11 and the pedestrian location estimated based on the satellite signal of good reception quality in the storage unit 13 (operation S1). With reference to FIG. 3, this procedure will be described in more detail.

As shown in FIG. 3, when the control unit 12 receives the pedestrian location and the first moving direction angle which are, respectively, estimated by the signal receiving unit 10 and the sensor unit 11, the control unit 12 checks if the reception quality of the satellite signal is good (operation S11).

At this time, the control unit 12 checks if the reception quality of the satellite signal is good based on DOP of the satellite 15 or SNR of the received satellite signal. More specifically, the control unit 12 determines that the reception quality of the satellite signal received by the signal receiving unit 10 is good when DOP of the satellite 15 is smaller than a predetermined DOP. DOP indicates an error value according to arrangement of the satellite, and the better the arrangement of the satellite, the smaller error value, which means the better reception quality of the satellite signal. Moreover, the control unit 12 determines that the reception quality of the satellite signal is good when the SNR of the received satellite signal is greater than a predetermined SNR. An SNR of a satellite signal is a power intensity of a satellite signal to a power intensity of noise ratio, and the greater the SNR value is, the better the reception quality of the satellite signal is.

Afterwards, the control unit 12 deletes all of the stored first moving direction angle and the pedestrian location from the storage unit 13 when the reception quality of the satellite signal is not good (operation S15). This is because if the reception quality of the satellite signal from the satellite is bad in a city or a mountain area, the satellite signal cannot ensure the accurate estimation of the pedestrian location.

Alternatively, when the reception quality of the satellite signal is good, the control unit 12 determines if a received satellite set used for the estimation of the pedestrian location is identical with a predetermined satellite set which has been already stored in the store unit 13 (operation S13). When the satellite sets are the same, error components will be removed and thus the accurate estimation of the pedestrian location is possible. To check if the satellite sets are the same, a satellite's unique number received from each satellite set may be used. The satellite's unique number may be pseudo random noise (PRN).

The control unit 12 deletes all of the first moving direction angle and the pedestrian location from the storage unit 13 when the received satellite set and the predetermined satellite set are not identical (operation S17). This is because the accurate estimation of the pedestrian location is not possible since error components caused by the satellites cannot be removed when the satellite sets are not the same.

The control unit 12 checks if the estimated pedestrian location is data collinear with a predetermined pedestrian location when the received satellite set and the predetermined satellite set are identical with each other (operation S13). It may be determined if the estimated pedestrian location data is collinear with the predetermined pedestrian location by determining if the estimated pedestrian location is within a preset range of data. This procedure is carried out for line fitting calculation for obtaining a linear equation, which will be described later.

The control unit 12 deletes all of the first moving direction angle and the pedestrian location from the storage unit 13 when the estimated pedestrian location is not collinear with the preset pedestrian location set (operation S17).

Alternatively, the control unit 12 checks if the detected first moving direction angle is within the predetermined range of angle when the estimated pedestrian location is collinear with the preset pedestrian location set (operation S14). The first moving direction angle needs to be similar to a moving direction angle of the pedestrian which is obtained based on the pedestrian location estimated by using the satellite signal of good reception quality.

The control unit 12 deletes all of the first moving direction angle and the pedestrian location from the storage unit 13 when the detected first moving direction angle is not within the predetermined range of angle (operation S17).

Alternatively, when the detected first moving direction angle is within the predetermined range, the control unit 12 stores the received first moving direction angle and the pedestrian location in the storage unit 13 (operation S15). Thereafter, the control unit 12 checks if the number of the pedestrian locations and the first moving direction angles stored in the storage unit is greater than a predetermined number (operation S16). Since a moving speed of a pedestrian is slower than a moving speed of a vehicle, it is not possible to collect a sufficient amount of data of the pedestrian location and the first moving direction angle required for pedestrian location estimation during a short period of time for which the pedestrian is on the move.

The control unit 12 proceeds with operation S10 to determine whether the pedestrian location and the first moving direction angle are of good quality and store them in the storage unit 13 when the number of each of the pedestrian locations and the first moving direction angles is smaller than the predetermined number.

Alternatively, the control unit 12 ceases to check if the pedestrian location and the first moving direction angle are of good quality and store the pedestrian location and the first moving direction angle in the storage unit 13 when the number of each of the stored pedestrian locations and the first moving direction angles are more than the predetermined number.

Subsequently, as shown in FIG. 2, the control unit 12 calculates a correction angle for the first moving direction angle using a second moving direction angle obtained by the use of the pedestrian locations stored in the storage unit 13 (operation S2). A procedure for calculating the correction angle for the first moving direction angle will now be described with reference to FIG. 4.

Figure 4:
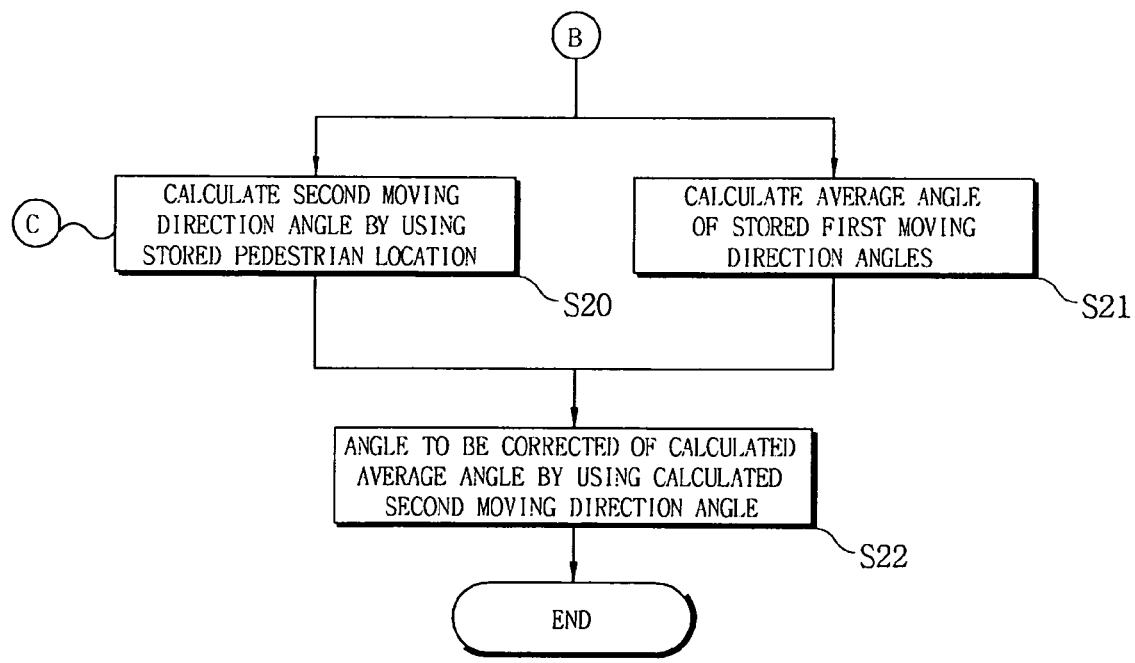
FIG. 4 is a flowchart of a method of calculating the second moving direction angle according to an embodiment of the present invention.

As shown in FIG. 4, the control unit 12 calculates the second moving direction angle of the pedestrian using the pedestrian locations stored in the storage unit 13 (operation S20), and calculates an average angle of the stored first moving direction angles (operation S21). A procedure for calculating the second moving direction angle will now be described with reference to FIG. 5.

Figure 5:
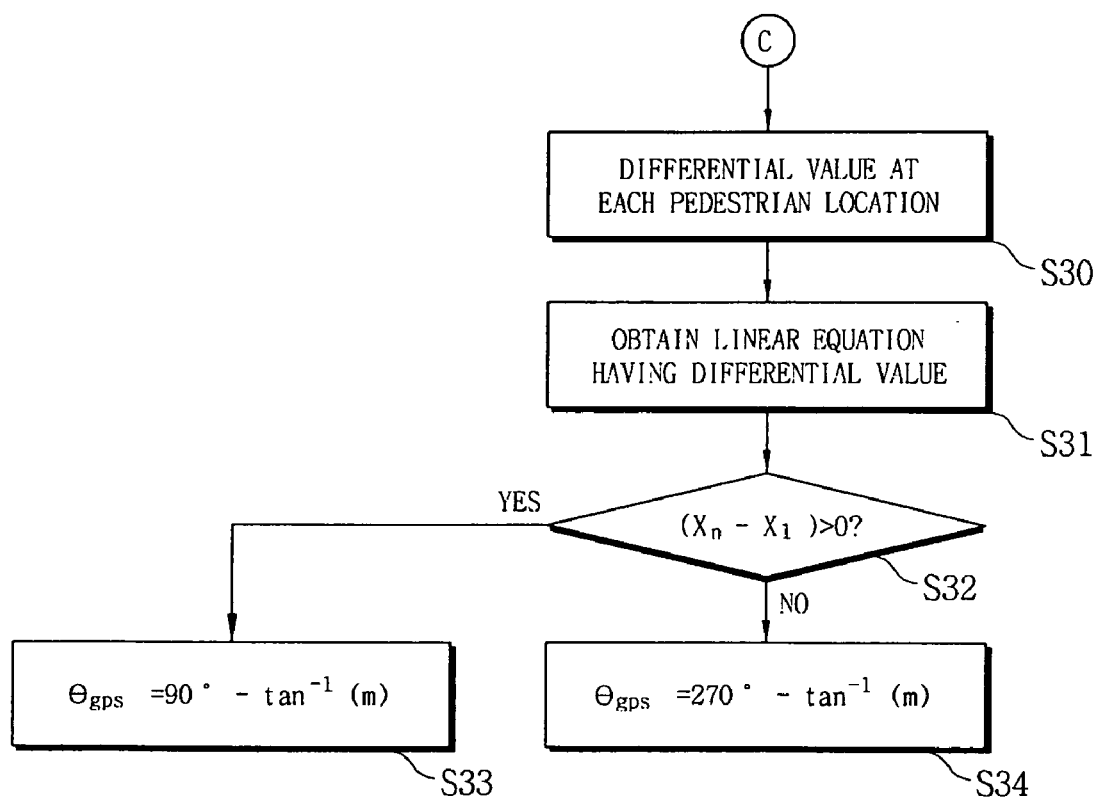
FIG. 5 is a flowchart of a method of calculating a correction angle of the first moving direction angle according to an embodiment of the present invention.

As shown in FIG. 5, the control unit 12 calculates a differential value of the stored pedestrian location (operation S30). The longitude and the latitude of the pedestrian location may be used to calculate the differential value. In this case, when the longitude and the latitude are represented by $x_i$ and $y_i$ (i=1, . . . , n), respectively, the differential value of the pedestrian location can be expressed by Equation 1 as shown below.

$$\Delta x_i \equiv x_i - x_1 (i=1, \ldots, n)$$

$$\Delta y_i \equiv y_i - y_1 (i=1, \ldots, n) \quad \text{Equation 1}$$

$X_1$ and $y_1$ represent the initial longitude and the initial latitude, respectively, and $\Delta xi$ and $\Delta yi$ represent, respectively, a longitude value obtained by subtracting the initial longitude $x_1$ from the longitude $X_i$, and a latitude value obtained by subtracting the initial latitude $y_1$ from the latitude $y_i$.

The control unit 12 employs line fitting calculation to obtain a linear equation that passes through calculated differential values (operation S31). The linear equation obtained by way of the line fitting calculation is expressed by Equation 2 as shown below.

$$y - \bar{y} = m(x - \bar{x}) \qquad \text{Equation 2}$$

Here, $$\bar{x} = \frac{1}{n}\sum_{i=1}^{n} \Delta x_i = \frac{\Delta x_i + \Delta x_2 \ldots + \Delta x_n}{n}$$

$$\bar{y} = \frac{1}{n}\sum_{i=1}^{n} \Delta y_i = \frac{\Delta y_1 + \Delta y_2 \ldots + \Delta y_n}{n}$$

$$m = \frac{(\Delta x_i \Delta y_1 + \Delta x_2 \Delta y_2 + \ldots + \Delta x_n \Delta y_n) - n\bar{x}\bar{y}}{(\Delta x_1^2 + \Delta x_2^2 + \ldots + \Delta x_n^2) - n\bar{x}^2}$$

In this case, m represents the slope of the obtained linear equation, and n represents the number of longitudes and latitudes used for the line fitting calculation.

The control unit 12 calculates the second moving direction angle, which is a moving direction angle of the pedestrian based on the satellite, by using the slope 'm' of the linear equation. A procedure for obtaining the second moving direction angle will now be described in detail.

The control unit 12 checks if the longitude of the pedestrian location is greater than 0, that is, $(x_n - x_1) > 0$ (operation S32), and when $(x_n - x_1) > 0$, the second moving direction angle is determined by using Equation 3 below (operation S33). In this case, $(x_n - x_1) > 0$ means that the pedestrian has moved to the east with respect to longitude.

$$\theta_{gps} = 90° - \tan^{-1}(m) \qquad \text{Equation 3}$$

Here, $\theta_{gps}$ denotes the second moving direction angle.

The control unit 12 determines the second moving direction angle using Equation 4 when the longitude of the pedestrian location is smaller than 0, that is, $(x_n - x_1) < 0$ (operation S34). A case of $(x_n - x_1) < 0$ means that the pedestrian has moved to the west with respect to longitude.

$$\theta_{gps} = 270° - \tan^{-1}(m) \qquad \text{Equation 4}$$

Subsequently, the control unit 12 calculates the correction angle with respect to the average angle of the first moving direction angles obtained by using the calculated second moving direction angle (operation S22). The correction angle with respect to the average angle of the first moving direction angles may be obtained by subtracting the average angle of the first moving direction angels from the second moving direction angle.

As shown in FIG. 2, the control unit 12 corrects the first moving direction angle detected by the sensor unit 11 using the calculated correction angle (operation S3). The calculated correction angle may occur due to the influence of the magnetic field around the apparatus, an error caused by inappropriate attachment of the terrestrial magnetism sensor, and a direction angle error due to the deflection difference between the magnetic north and the true north. Accordingly, the calculated correction angle may be an angle that corresponds to an azimuth error component included in the first moving direction angle.

As described above, according to one or embodiments of the present invention, a satellite signal of good reception quality is used to calculate a moving direction angle of a pedestrian, and a moving direction angle of the pedestrian which is detected by a terrestrial magnetism sensor is corrected by using the calculated moving direction angle, and thus the accurate estimation of the pedestrian location using the terrestrial magnetism sensor is possible.

Embodiments can be implemented in computing hardware (computing apparatus) and/or software, such as (in a non-limiting example) any computer that can store, retrieve, process and/or output data and/or communicate with other computers, for example. Results produced can be displayed on a display of the computing hardware. A program/software implementing embodiments may be recorded on computer-readable media including computer-readable recording media. The program/software implementing embodiments may also be transmitted over transmission communication media. Examples of the computer-readable recording media include at least a magnetic recording apparatus, an optical disk, a magneto-optical disk, and/or a semiconductor memory (for example, RAM, ROM, etc.). Examples of the magnetic recording apparatus include at least a hard disk device (HDD), a flexible disk (FD), and a magnetic tape (MT). Examples of the optical disk include at least a DVD (Digital Versatile Disc), a DVD-RAM, a CD-ROM (Compact Disc-Read Only Memory), and a CD-R (Recordable)/RW. An example of communication media includes a carrier-wave signal. A transmission communication media may be an apparatus that carries such a communication media Further, according to one ore more aspects of the present invention, any combination of the described features, functions, and/or operations may also be provided.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for correcting a pedestrian moving direction, comprising:
   a signal receiving unit which estimates a pedestrian location using a satellite signal from a satellite;
   a sensor unit which detects a first moving direction angle using a terrestrial magnetism sensor; and
   a control unit which calculates a second moving direction angle using a pedestrian location estimated by using a satellite signal of good reception quality and corrects the first moving direction angle detected by the terrestrial magnetism sensor by using the calculated second moving direction angle.

2. The apparatus of claim 1, wherein the control unit checks whether a reception quality of a satellite signal received by the signal receiving unit meets a quality threshold, and if the reception quality of the satellite signal meets the quality threshold, the control unit calculates the second moving direction angle using by the estimated pedestrian location.

3. The apparatus of claim 2, wherein the control unit checks the reception quality of the satellite signal by using dilution of precision (DOP) of the satellite or a signal to noise ratio (SNR) of the received satellite signal.

4. The apparatus of claim 2, wherein the control unit obtains a linear equation that passes through the estimated pedestrian location by using line fitting calculation, and obtains a slope of the obtained linear equation to calculate a second moving direction angle.

5. A navigation system, including a pedestrian moving direction correcting apparatus, the system comprising a signal receiving unit which estimates a pedestrian location by using a satellite signal from a satellite, a sensor unit which detects a first moving direction angle, and a control unit which calculates a second moving direction angle using a pedestrian location estimated by using a satellite signal of good reception quality and corrects the first moving direction angle detected by the terrestrial magnetism sensor by using the calculated second moving direction angle.

6. A method of correcting a moving direction of a pedestrian, comprising:
   storing a first moving direction angle estimated by using the intensity of the Earth's magnetic field detected by a terrestrial magnetism sensor and a pedestrian location estimated by using a satellite signal meeting a reception quality threshold;
   calculating a second moving direction angle by using the stored pedestrian location, and a correction angle of the stored first moving direction angle by using the second moving direction angle; and
   correcting a first moving direction angle detected by the terrestrial magnetism sensor by using the calculated correction angle.

7. The method of claim 6, further comprising:
   estimating a pedestrian location by using a satellite signal received from a satellite; and
   detecting a first moving direction angle by measuring the intensity of the Earth's magnetic field by using a terrestrial magnetism sensor.

8. The method of claim 7, wherein the storing of the estimated pedestrian location by using the satellite signal meeting the reception quality threshold includes checking whether a reception quality of the satellite signal from the satellite meets the threshold, and storing the estimated pedestrian location when the reception quality is determined to meet the threshold.

9. The method of claim 8, wherein the reception quality of the satellite signal from the satellite is checked by using dilution of precision (DOP) of the satellite or a signal to noise ratio (SNR) of the received satellite signal.

10. The method of claim 6, wherein the calculating of the second moving direction angle by using the stored pedestrian location includes obtaining a linear equation, which passes through the estimated pedestrian location, by using line fitting calculation, and calculating the second moving direction angle of the pedestrian by identifying a slope of the obtained linear equation.

* * * * *